(12) United States Patent
Hamada

(10) Patent No.: US 6,833,857 B2
(45) Date of Patent: Dec. 21, 2004

(54) MOVING PICTURE COMMUNICATION METHOD AND APPARATUS

(75) Inventor: Masao Hamada, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 137 days.

(21) Appl. No.: 10/259,875

(22) Filed: Sep. 30, 2002

(65) Prior Publication Data
US 2003/0112358 A1 Jun. 19, 2003

(30) Foreign Application Priority Data
Sep. 28, 2001 (JP) ........................................ 2001-300990

(51) Int. Cl.⁷ ................................................ H04N 7/14
(52) U.S. Cl. ............................... 348/14.02; 348/14.07; 348/14.16
(58) Field of Search ........................... 348/14.01–14.16, 348/211.12, 333.05, 333.12, 376, 222.1; 379/90.01, 93.08, 93.17, 93.21, 110.01

(56) References Cited

U.S. PATENT DOCUMENTS

2001/0008412 A1    7/2001    Ando et al.

FOREIGN PATENT DOCUMENTS

| EP | 1 071 285 | 1/2001 |
|----|-----------|--------|
| EP | 1 111 919 | 6/2001 |
| EP | 1 120 968 | 8/2001 |
| EP | 1 126 709 | 8/2001 |
| EP | 1 143 724 | 10/2001 |
| JP | 9-83981   | 3/1997 |
| WO | 01/33850  | 5/2001 |

Primary Examiner—Wing F. Chan
(74) Attorney, Agent, or Firm—Wenderoth, Lind & Ponack, L.L.P.

(57) ABSTRACT

When picture information of a user's party, enlarged and pivoted at an angle of some 90 degrees, is displayed on an image display of a cell-phone type moving picture communication apparatus of a user, which has been pivoted at an angle of nearly 90 degrees in an either clockwise or counter clockwise direction of the user's cell-phone type moving picture communication apparatus when the user faces the image display of the user's communication apparatus. Then, a pivoting unit pivots user's self-picture information in response to pivotal movement of the user's cell-phone type moving picture communication apparatus. The image display has an aspect ratio defined by different vertical and horizontal lengths. An image pick-up unit of the pivoted user's cell-phone type moving picture communication apparatus produces the user's self-picture information. An encoding unit encodes the pivoted user's self-picture information. A transmitting unit transmits the encoded user's self-picture information to a cell-phone type moving picture communication apparatus of the user's party. Since the party's cell-phone type moving picture communication apparatus receives the pivoted user's self-picture information from the user's cell-phone type moving picture communication apparatus, the user's self-picture information properly oriented with respect to the vertical axis of the earth is displayed on the party's cell-phone type moving picture communication apparatus.

16 Claims, 12 Drawing Sheets self-picture to be sent to party before pivoting after pivoting

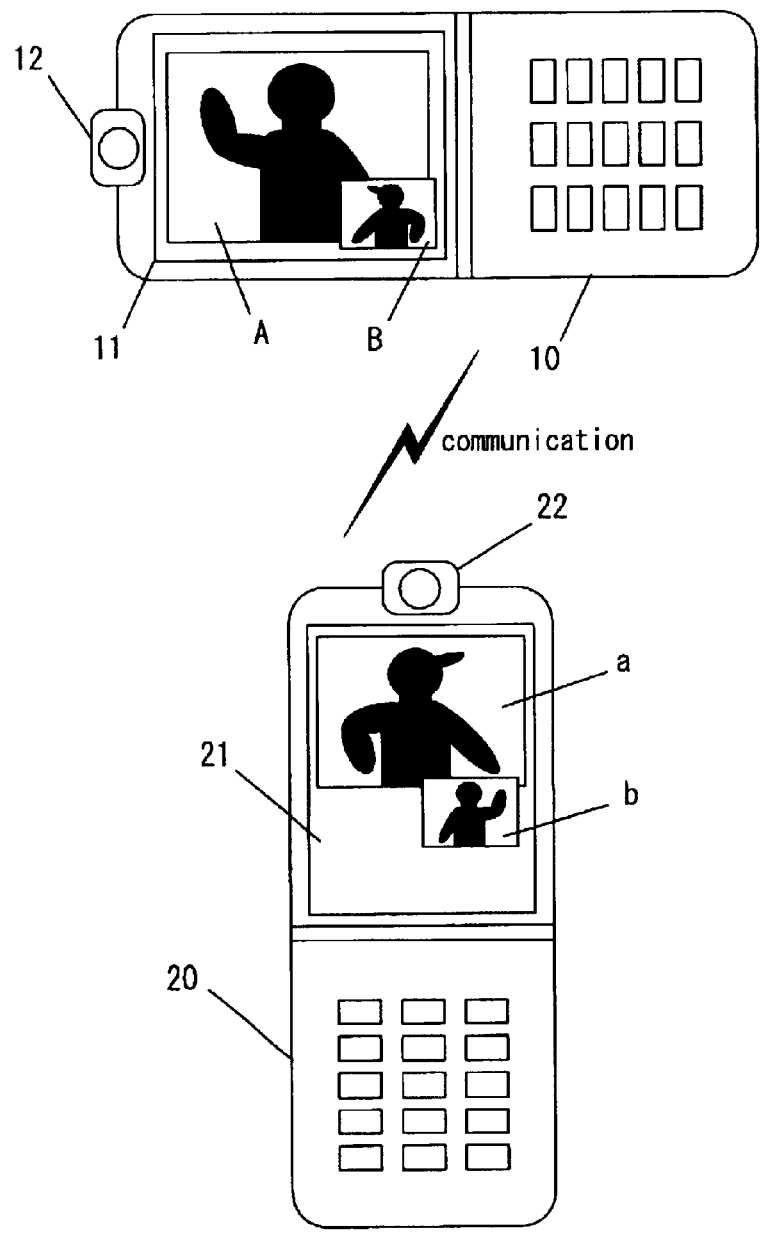

vertical horizontal vertical horizontal party's cell-phone type moving
picture communication apparatus party's cell-phone type moving picture
communication apparatus
pivoted at a right angle

MOVING PICTURE COMMUNICATION METHOD AND APPARATUS

BACKGROUND OF THE INVENTION

1. Field of the Invention

The present invention relates to a moving picture communication method and apparatus for communicating moving picture information.

2. Description of the Related Art

FIG. 9 illustrates a pair of a typical stationary moving picture communication apparatus by way of illustration As illustrated in FIG. 9, stationary TV phones 30,40 include image displays 31, 41 and cameras 32, 42, respectively. The image display 31 displays a self-picture "E" of a user, i.e., a user of phone 30, and a picture "D" of a user's party, i.e., a user of phone 40. The image display 41 displays a self-picture "e" of the user's party and a picture "d" of the user.

The TV phones 30, 40 are usually locked against rotation. Therefore, the image displays 31, 41 are oriented in fixed directions. The cameras 32, 42 are locked against rotation about respective optical axes thereof.

The TV phones 30, 40, both of which remain positioned substantially vertically, are used to provide TV phone communication therebetween, thereby communicating moving pictures therebetween.

Meanwhile, the use of a cell-phone type moving picture communication apparatus provides different modes of TV phone-to-TV phone communication.

FIG. 10 is a descriptive illustration, showing how a pair of conventional cell-phone type moving picture communication apparatuses is used. As illustrated in FIG. 10(a), the pair of cell-phone type moving picture communication apparatuses 35, 45 is usually vertically positioned to provide TV phone communication therebetween. Alternatively, as shown in FIG. 10(b), the pair of moving picture communication apparatuses 35, 45 is horizontally positioned to communicate with one another. In this instance, the cell-phone type moving picture communication apparatuses 35, 45 are pivoted at an angle of 90 degrees in a clockwise or counter clockwise direction of the same communication apparatus 35, 45 when respective users face image displays 36, 46 thereof.

As illustrated in FIG. 10, the cell-phone type moving picture communication apparatus 35,45 includes the image displays 36,46 and cameras 37, 47, respectively.

The display image 36 displays a self-picture "E" of a user, i.e., user of moving picture communication apparatus 35, and a picture "D" of a user's party, i.e., user of moving picture communication apparatus 45. The display image 46 displays a self-picture "e" of the user's party and a picture "d" of the user. The displayed self-pictures "E" and "e" are downsized as mirror images that are obtained by inverting the respective self-pictures to be sent to the party's cell-phone type communication apparatus.

The cameras 37, 47 are locked against rotation about respective optical axes thereof.

FIG. 11 is a descriptive illustration, showing how the conventional cell-phone type moving picture communication apparatus of the user displays a picture of the user's party. As illustrated in FIG. 11(a), when the user's moving picture communication apparatus 35 is vertically positioned to communicate with the party's communication apparatus 45, then the party's picture "D" is displayed on the image display 36 that has an aspect ratio defined by different horizontal and vertical lengths in which the vertical length is greater than the other.

As illustrated in FIG. 11(b), when the user's moving picture communication apparatus 35 is pivoted at an angle of 90 degrees in a counter clockwise direction thereof when the user faces the image display 36, then the party's picture "D" is enlarged and pivoted at an angle of 90 degrees in a direction opposite to the direction in which the user's moving picture communication apparatus 35 is pivoted. This system allows an enlarged party's picture "F" to be displayed on the image display 36 without detracting from party's picture information.

OBJECTS AND SUMMARY OF THE INVENTION

However, a problem arises when one of the pair of cell-phone type moving picture communication apparatuses is horizontally positioned to communicate with the other communication apparatus, as illustrated in FIG. 11(b).

FIG. 12 is a descriptive illustration, showing the problem that is encountered when a pair of conventional cell-phone type moving picture communication apparatuses is used to provide TV phone communication.

FIG. 12 presupposes that the user uses the counter clockwise pivoted cell-phone type moving picture communication apparatus 35 as shown in FIG. 11(b), while the user's party uses the vertically positioned cell-phone type moving picture communication apparatus 45 as illustrated in FIG. 12(a).

At this time, the camera 37 on the user's moving picture communication apparatus 35 is locked against rotation about an optical axis thereof. As a result, as illustrated in FIG. 12(a), a user's self-picture "f" displayed on the image display 46 of the party's moving picture communication apparatus 45 is pivoted at a right angle.

Consequently, as shown in FIG. 12(b), the user's party usually pivots the party's communication apparatus 45 at a right angle in order to render the user's self-picture "f" easy to view.

However, such pivotal movement of the party's communication apparatus 45 causes another problem with the user's communication apparatus 35 because the camera 47 on the party's communication apparatus 45 is also locked against rotation about an optical axis thereof. This means that the enlarged party's picture "F" displayed on the user's communication apparatus 35 as illustrated in FIG. 11(b) is objectionably pivoted at an angle of 90 degrees. As a result, proper moving picture communication fails to be established.

Eventually, there is no other way to stop displaying the enlarged party's picture "F" on the user's communication apparatus 35. Consequently, the TV phone-to-TV phone communication can be established only when the pair of cell-phone type moving picture communication apparatus is used in a usual manner as illustrated in, e g., FIG. 10(b).

In short, a problem with the conventional cell phone type moving picture communication apparatus is that proper moving picture communication fails to be established when the enlarged party's picture is displayed on the user's communication apparatus 35 that has been pivoted at an angle of 90 degrees.

In view of the above, an object of the present invention is to provide a moving picture communication method and apparatus designed to provide proper moving picture communication, even when a party's picture information enlarged and pivoted at an angle of 90 degrees is displayed on an image display of the moving picture communication apparatus that has been pivoted.

A first aspect of the present invention provides a moving picture communication method comprising communicating moving picture information between a moving picture communication apparatus of a user and another moving picture communication apparatus of a user's party, in which an image display on the user's moving picture communication apparatus has an aspect ratio defined by different vertical and horizontal lengths, pivoting a party's picture information through an angle of substantially 90 degrees, the party's picture information being received from the party's moving picture communication apparatus, enlarging the party's picture information received from the party's moving picture communication apparatus, displaying the pivoted and enlarged party's picture information on the image display of the user's moving picture communication apparatus that has been pivoted in an either clockwise or counter clockwise direction of the user's moving picture communication apparatus when the user faces the image display of the user's moving picture communication apparatus, producing a user's self-picture information, pivoting the user's self-picture information as first pivotal processing in response to pivotal movement of the user's moving picture communication apparatus, encoding the pivoted user's self-picture information, and transmitting the encoded user's self-picture information to the party's moving picture communication apparatus.

In other words, the first aspect of the present invention provides a moving picture communication method comprising communicating moving picture information between a first moving picture communication apparatus of a first user and a second moving picture communication apparatus of a second user, the first moving picture communication apparatus having an image display that has an aspect ratio defined by different vertical and horizontal lengths, receiving, with the first moving picture communication apparatus, second user picture information from the second moving picture communication apparatus, pivoting the second user picture information through an angle of substantially 90 degrees, enlarging the second user picture information, displaying the pivoted and enlarged second user picture information on the image display of the first moving picture communication apparatus that has been pivoted in a direction, the direction being one of clockwise and counter clockwise of the first moving picture communication apparatus when the first user faces the image display of the first moving picture communication apparatus, producing first user picture information, pivoting the first user picture information in response to said pivoting of the first moving picture communication apparatus, encoding the pivoted first user picture information, and transmitting the encoded first user picture information to the second moving picture communication apparatus.

This system allows the pivoted user's self-picture information to be transmitted to the party's moving picture communication apparatus when the party's picture information enlarged and pivoted at an angle of nearly 90 degrees is displayed on the image display of the user's moving picture communication apparatus that has been pivoted in an either clockwise or counter clockwise direction of the same apparatus when the user faces the image display.

This feature allows moving picture information properly oriented with respect to the vertical axis of the earth to be displayed on the party's moving picture communication apparatus.

As a result, proper moving picture communication is established, even when the party's picture information enlarged and pivoted at an angle of some 90 degrees is displayed on the image display of the pivoted user's moving picture communication apparatus.

A second aspect of the present invention provides a moving picture communication method, comprising communicating moving picture information between a moving picture communication apparatus of a user and another moving picture communication apparatus of a user's party, in which an image display on the user's moving picture communication apparatus has an aspect ratio defined by different vertical and horizontal lengths, pivoting a party's picture information through an angle of substantially 90 degrees, the party's picture information being received from the party's moving picture communication apparatus, enlarging the party's picture information received from the party's moving picture communication apparatus, displaying the pivoted and enlarged party's picture information on the image display of the user's moving picture communication apparatus that has been pivoted in an either clockwise or counter clockwise direction of the user's moving picture communication apparatus when the user faces the image display of the user's moving picture communication apparatus, producing a user's self-picture information, pivoting the user's self-picture information as first pivotal processing in response to pivotal movement of the user's moving picture communication apparatus, enlarging the user's self-picture information, encoding the pivoted and enlarged user's self-picture information, and transmitting the encoded user's self-picture information to the party's moving picture communication apparatus.

In other words, the second aspect of the present invention provides a moving picture communication method comprising communicating moving picture information between a first moving picture communication apparatus of a first user and a second moving picture communication apparatus of a second user, the first moving picture communication apparatus having an image display that has an aspect ratio defined by different vertical and horizontal lengths, receiving, with the first moving picture communication apparatus, second user picture information from the second moving picture communication apparatus, pivoting the second user picture information through an angle of substantially 90 degrees, enlarging the second user picture information, displaying the pivoted and enlarged second user picture information on the image display of the first moving picture communication apparatus that has been pivoted in a direction, the direction being one of clockwise and counter clockwise of the first moving picture communication apparatus when the first user faces the image display of the first moving picture communication apparatus, producing first user picture information, pivoting the first user picture information in response to said pivoting of the first moving picture communication apparatus, enlarging the first user picture information, encoding the pivoted and enlarged first user picture information, and transmitting the encoded first user picture information to the second moving picture communication apparatus.

This system allows the pivoted and enlarged user's self-picture information to be transmitted to the party's moving picture communication apparatus when the party's picture information enlarged and pivoted at an angle of nearly 90 degrees is displayed on the image display of the user's moving picture communication apparatus that has been pivoted in an either clockwise or counter clockwise direction of the same apparatus when the user faces the image display.

This feature allows moving picture information properly oriented with respect to the vertical axis of the earth is displayed on the party's moving picture communication apparatus, and further allows the user's self-picture information that matches in display size with the party's moving picture communication apparatus to be transmitted to the party's moving picture communication apparatus.

As a result, proper moving picture communication that agrees in display size with the party's moving picture communication apparatus is established, even when the party's picture information enlarged and pivoted at an angle of nearly 90 degrees is displayed on the image display of the pivoted user's moving picture communication apparatus.

A third aspect of the present invention provides a moving picture communication method comprising communicating moving picture information between a moving picture communication apparatus of a user and another moving picture communication apparatus of a user's party, in which an image display on the user's moving picture communication apparatus has an aspect ratio defined by different vertical and horizontal lengths, pivoting a party's picture information through an angle of substantially 90 degrees, the party's picture information being received from the party's moving picture communication apparatus, enlarging the party's picture information received from the party's moving picture communication apparatus, displaying the pivoted and enlarged party's picture information on the image display of the user's moving picture communication apparatus that has been pivoted in an either clockwise or counter clockwise direction of the user's moving picture communication apparatus when the user faces the image display of the user's moving picture communication apparatus, producing a user's self-picture information, pivoting the user's self-picture information as first pivotal processing in response to pivotal movement of the user's moving picture communication apparatus, providing additional image-plotting information to the user's self-picture information, encoding the pivoted user's self-picture information that has the additional image-plotting information provided thereto, and transmitting the encoded user's self-picture information to the party's moving picture communication apparatus.

In other words, the third aspect of the present invention provides a moving picture communication method comprising communicating moving picture information between a first moving picture communication apparatus of a first user and a second moving picture communication apparatus of a second user, the first moving picture communication apparatus having an image display that has an aspect ratio defined by different vertical and horizontal lengths, receiving, with the first moving picture communication apparatus, second user picture information from the second moving picture communication apparatus, pivoting the second user picture information through an angle of substantially 90 degrees, enlarging the second user picture information, displaying the pivoted and enlarged second user picture information on the image display of the first moving picture communication apparatus that has been pivoted in a direction, the direction being one of clockwise and counter clockwise of the first moving picture communication apparatus when the first user faces the image display of the first moving picture communication apparatus, producing first user picture information, pivoting the first user picture information in response to said pivoting of the first moving picture communication apparatus, providing image-plotting information to the pivoted first user picture information, encoding the pivoted first user picture information with the image-plotting information, and transmitting the encoded first user picture information to the second moving picture communication apparatus.

This system allows the pivoted user's self-picture information to be transmitted to the party's moving picture communication apparatus when the party's picture information enlarged and pivoted at an angle of nearly 90 degrees is displayed on the image display of the user's moving picture communication apparatus that has been pivoted in an either clockwise or counter clockwise direction of the same apparatus when the user faces the image display.

This feature allows moving picture information properly oriented with respect to the vertical axis of the earth is displayed on the party's moving picture communication apparatus.

As a result, proper moving picture communication is established, even when the party's picture information enlarged and pivoted at an angle of nearly 90 degrees is displayed on the image display of the pivoted user's moving picture communication apparatus.

In addition, the additional image-plotting information is provided to the user's self-picture information. This means that other information such as character information in addition to moving pictures can be transmitted to the party's moving picture communication apparatus.

A fourth aspect of the present invention provides a moving picture communication method comprising communicating moving picture information between a moving picture communication apparatus of a user and another moving picture communication apparatus of a user's party, in which an image display on the user's moving picture communication apparatus has an aspect ratio defined by different vertical and horizontal lengths, displaying party's picture information on the image display of the user's moving picture communication apparatus, the party's picture information being received from the party's moving picture communication apparatus, producing user's self-picture information, providing additional image-plotting information to the user's self-picture information, encoding the user's self-picture information that has the additional image-plotting information provided thereto, and transmitting the encoded user's self-picture information to the party's moving picture communication apparatus.

In other words, the fourth aspect of the present invention provides a moving picture communication method comprising communicating moving picture information between a first moving picture communication apparatus of a first user and a second moving picture communication apparatus of a second user, the first moving picture communication apparatus having an image display that has an aspect ratio defined by different vertical and horizontal lengths, receiving, with the first moving picture communication apparatus, second user picture information from the second moving picture communication apparatus, displaying the second user picture information on the image display, producing first user picture information, providing image-plotting information to the first user picture information, encoding the first user picture information with the image-plotting information, and transmitting the encoded first user picture information to the second moving picture communication apparatus.

This system allows additional image-plotting information to be provided to the user's self-picture information. As a result, other information such as character information in addition to moving images can be sent to the party's moving picture communication apparatus.

The addition of the additional image-plotting information to the user's self-picture information reduces a moving picture area or rather the user's self-picture information. As a result, the resulting coding amount can be inhibited when an interframe predictive coding system is used.

A fifth aspect of the present invention provides a moving picture communication method as defined in the fourth aspect thereof, further comprising pivoting the user's self-picture information as first pivotal processing in response to pivotal movement of the user's moving picture communication apparatus, wherein the step of displaying the party's picture information received from the party's moving picture communication apparatus includes pivoting the party's picture information through an angle of substantially 90 degrees, enlarging the party's picture information, and displaying the pivoted and enlarged party's picture information on the image display of the user's moving picture communication apparatus that has been pivoted in an either clockwise or counter clockwise direction of the user's moving picture communication apparatus when the user faces the image display of the user's moving picture communication apparatus, and wherein providing additional image-plotting information to the user's self-picture information includes providing additional image-plotting information to the user's self-picture information that has been pivoted as the first pivotal processing.

In other words, the fifth aspect of the present invention provides a moving picture communication method as defined in the fourth aspect thereof, further comprising pivoting the first user picture information in response to a pivotal movement of the first moving picture communication apparatus, wherein the displaying the second user picture information comprises pivoting the second user picture information through an angle of substantially 90 degrees, enlarging the second user picture information, pivoting the first moving picture communication apparatus in a clockwise or counter clockwise direction when the first user faces the image display and displaying the pivoted and enlarged second user picture information on the image display, and wherein the providing image-plotting information to the first user picture information comprises providing the image-plotting information to the pivoted first user picture information.

This system allows the pivoted user's self-picture information to be transmitted to the party's moving picture communication apparatus when the party's picture information enlarged and pivoted at an angle of nearly 90 degrees is displayed on the image display of the user's moving picture communication apparatus that has been pivoted in an either clockwise or counter clockwise direction of the same apparatus when the user faces the image display.

This feature allows moving picture information properly positioned with respect to the vertical axis of the earth to be displayed on the party's moving picture communication apparatus.

As a result, proper moving picture communication is established, even when the party's picture information enlarged and pivoted at an angle of nearly 90 degrees is displayed on the image display of the pivoted user's moving picture communication apparatus.

In addition, the additional image-plotting information is provided to the user's self-picture information, regardless of whether the user's moving picture communication apparatus is pivoted. This feature allows the user's self-picture information to be transmitted to the party's moving picture communication apparatus in a similar form between when the user's moving picture communication apparatus is pivoted to communicate with the party's moving picture communication apparatus and when the user's communication apparatus is non-pivoted to communicate therewith.

A sixth aspect of the present invention provides a moving picture communication method as defined in the third or fourth aspect of the present invention, wherein providing additional image-plotting information includes providing different image-plotting information to the user's self-picture information based on a communication state.

In other words, the sixth aspect of the present invention provides a moving picture communication method as defined in the third or fourth aspect of the present invention, wherein the providing additional image-plotting information to the first user picture information includes providing different image-plotting information to the first user picture information based on a communication state.

This system permits different amounts of image-plotting information to be provided to the user's self-picture information to further reduce a moving picture area or rather the user's self-picture information when a poor moving picture communication state reduces communication data speeds. This feature reduces the resulting code amount. As a result, the user's self-picture information can be sent to the party's moving picture communication apparatus while the number of frames to be transferred per second is retained.

A seventh aspect of the present invention provides a moving picture communication method as defined in the third or fourth aspect of the present invention, wherein producing user's self-picture information includes generating a square of user's self-picture information.

In other words, the seventh aspect of the present invention provides a moving picture communication method as defined in the third or fourth aspect of the present invention wherein producing first user picture information comprises producing a square of the first user picture information.

This system requires at least only a square zone as an area of a moving image (or rather a self-picture) to be picked up, even with moving picture communication environments in which moving picture information having an aspect ratio defined by different horizontal and vertical lengths is communicated. This feature is realized by the addition of image plotting information to the user's self-picture information. As a result, an image pick-up unit can include a reduced volume of memory.

In addition, the square of self-picture information can be pivoted in a simplified manner, and can be processed with less man-hour rates.

An eighth aspect of the present invention provides a moving picture communication method as defined in the first or third aspect of the present invention, further comprising pivoting, as second pivotal processing, the user's self-picture information that has been pivoted as the first pivotal processing, inverting the user's self-picture information that has been pivoted as the first pivotal processing, in order to provide a mirror image of the user's self-picture information, downsizing the inverted user's self-picture information that has been pivoted as the second pivotal processing, and displaying the downsized user's self-picture information on the image display of the user's moving picture communication apparatus.

In other words, the eight aspect of the present invention provides a moving picture communication method as defined in the first or third aspect of the present invention, further comprising inverting the pivoted first user picture information to provide a mirror image of the first user picture information, further pivoting the pivoted first user picture information, downsizing the inverted further pivoted first user picture information, and displaying the downsized first user picture information on the image display.

This system allows moving picture communication apparatuses to be held while the user's self-picture information to be transmitted to the party's moving picture communication apparatus is checked to see how it looks like.

A ninth aspect of the present invention provides a moving picture communication method as defined in the second aspect of the present invention, further comprising pivoting, as second pivoting processing, the enlarged user's self-picture information that has been pivoted as the first pivotal processing, inverting the enlarged user's self-picture information that has been pivoted as the first pivotal processing, in order to provide a mirror image of the user's self-picture information, downsizing the inverted user's self-picture information that has been pivoted as the second pivotal processing, and displaying the downsized user's self-picture information on the image display of the user's moving picture communication apparatus.

In other words, the ninth aspect of the present invention provides a moving picture communication method as defined in the second aspect of the present invention, further comprising inverting the enlarged pivoted first user picture information to provide a mirror image of the first user picture information, further pivoting the enlarged pivoted first user picture information, downsizing the inverted further pivoted first user picture information, and displaying the downsized first user picture information on the image display.

This system allows moving picture communication apparatuses to be held while the user's self-picture information to be transmitted to the party's moving picture communication apparatus is checked to see how it looks like.

A tenth aspect of the present invention provides a moving picture communication method as defined in the fourth aspect of the present invention, further comprising inverting the user's self-picture information in order to provide a mirror image of the user's self-picture information, downsizing the user's self-picture information, and displaying the inverted and downsized user's self-picture information on the image display of the user's moving picture communication apparatus.

In other words, the tenth aspect of the present invention provides a moving picture communication method as defined in the fourth aspect of the present invention, further comprising inverting the first user picture information in order to provide a mirror image of the first user picture information, downsizing the first user picture information, and displaying the inverted and downsized first user picture information on the image display.

This system allows moving picture communication apparatuses to be held while the user's self-picture information to be transmitted to the party's moving picture communication apparatus is checked to see how it looks like.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is an exemplary illustration, showing how the cell-phone type moving picture communication apparatus according to the first embodiment is used to communicate with another moving picture communication apparatus.

DETAILED DESCRIPTION OF THE PREFERRED EMBODIMENTS

Embodiments of the present invention will now be described with reference to the drawings. It is to be noted that moving picture information is communicated as image information in the exemplary embodiments.

(Embodiment 1)

Figure 1:
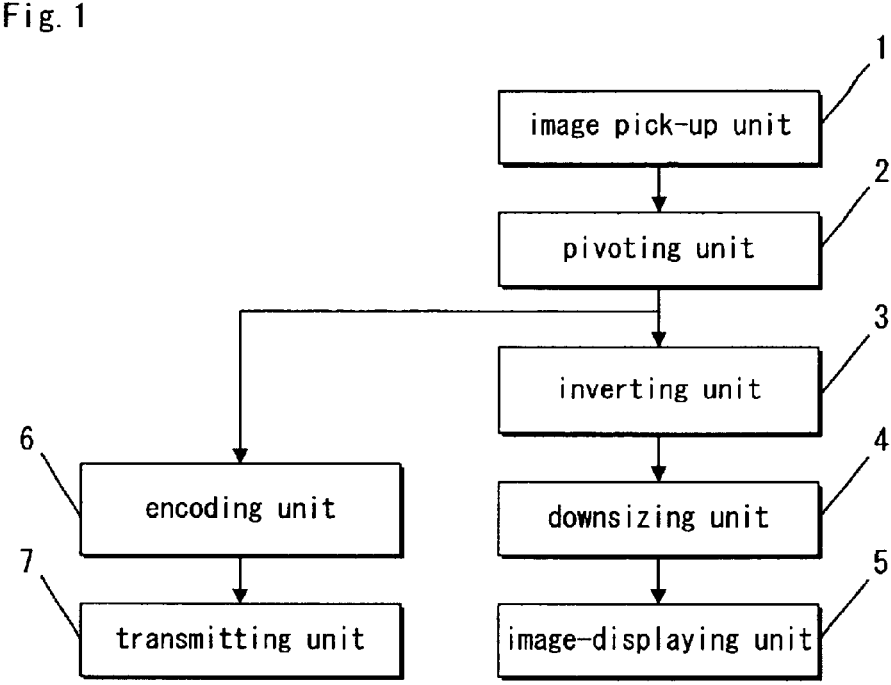
FIG. 1 is a block diagram, illustrating an exemplary cell-phone type moving picture communication apparatus according to a first embodiment of the present invention.

FIG. 1 is a block diagram, illustrating an exemplary cell-phone type moving picture communication apparatus according to a first embodiment of the present invention. As illustrated in FIG. 1, the moving picture communication apparatus includes an image pick-up unit 1, a pivoting unit 2, an inverting unit 3, a downsizing unit 4, an image-displaying unit 5, an encoding unit 6, and a transmitting unit 7.

The image pick-up unit 1 includes a camera or equivalent for generating self-picture information.

Figure 2A:
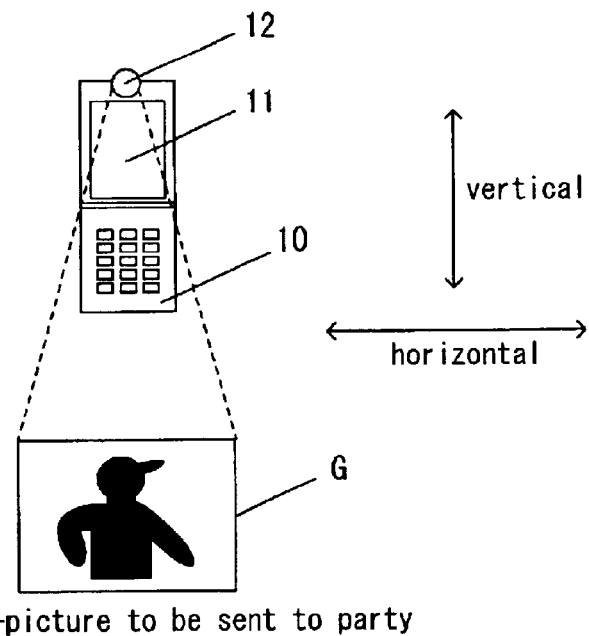
FIG. 2(a) is a descriptive illustration, showing the exemplary cell-phone type moving picture communication apparatus vertically positioned to communicate with another cell-phone type moving picture communication apparatus.
Figure 2B:
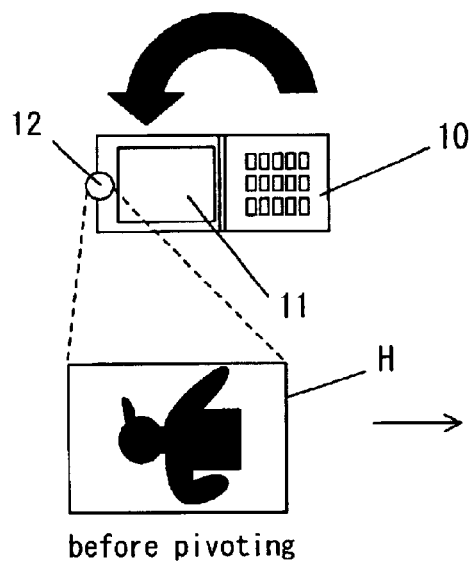
FIG. 2(b) is a descriptive illustration, showing how an exemplary pivoting unit works in the moving picture communication apparatus according to the first embodiment.
Figure 2C:
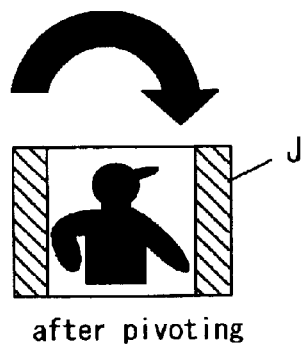
FIG. 2(c) is a descriptive illustration, showing how the exemplary pivoting unit works in the moving picture communication apparatus according to the first embodiment.

FIG. 2 is a descriptive illustration, showing how an exemplary pivoting unit 2 of FIG. 1 works. FIG. 2(a) illustrates a step in which the pivoting unit 2 does not pivot the self-picture information. FIG. 2(b) illustrates another step in which the pivoting unit 2 pivots the self-picture information. FIG. 2(c) illustrates results from the step in which the pivoting unit 2 pivots the self-picture information.

As illustrated in FIG. 2, the exemplary cell-phone type moving picture communication apparatus 10 according to the present embodiment includes a camera 12 and an image display 11. The image display 11 has an aspect ratio defined by different vertical and horizontal lengths in which the vertical length is greater than the other.

The image-displaying unit 5 of FIG. 1 includes the image display 11. The image pick-up unit 1 of FIG. 1 includes the camera 12.

As illustrated in FIG. 2(a), when a user usually carries the moving picture communication apparatus 10 therewith, or when the communication apparatus 10 is vertically positioned, then self-picture information "G", a user's moving image picked up by the camera 12, is encoded without being pivoted by the pivoting unit 2. The encoded self-picture information "G" is sent to a cell-phone type moving picture communication apparatus that is carried with a user's party.

The reason why the self-picture information "G" need not be pivoted is that the self-picture information "G" is properly oriented with reference to the vertical axis of the earth When an enlarged party's picture is displayed on the user's moving picture communication apparatus 10 that has been horizontally positioned to communicate with the party's communication apparatus, or more specifically when party's picture information enlarged and pivoted at a right angle is displayed on the image display 11 of the user's communication apparatus 10 that has been pivoted at an angle of 90 degrees in an either clockwise or counter clockwise direction of the same communication apparatus 10 when the user faces the image display 11, then the pivoting unit 2 pivots the user's self-picture information in a direction responsive to the direction in which the user's communication apparatus 10 is pivoted.

Unless otherwise provided herein, the terms "clockwise" and "counter clockwise" refer to clockwise and counter clockwise directions of the communication apparatus 10 when the user faces the image display 11, respectively.

In FIG. 2(b), the user's moving image is picked up using the moving picture communication apparatus 10 that has been pivoted counter clockwise at a right angle, thereby providing self-picture information "H". As illustrated in FIG. 2(c), the pivoting unit 2 pivots the self-picture information "H" clockwise at a right angle, thereby providing self-picture information "J".

As illustrated in FIG. 2(b), the self-picture information "H" has a user's self-picture counter clockwise pivoted at an angle of 90 degrees. Such a pivoted self-picture is obviously improperly oriented with respect to the vertical axis of the earth. Therefore, as illustrated in FIG. 2(c), the improperly oriented self-picture is pivoted in an attempt to be directed properly with respect to the vertical axis of the earth. As a result, the self-picture information "J" containing such a properly oriented self-picture is provided.

The pivoting unit 2 pivots the self-picture information "H" in response to self-picture pivoting instructions from the user. Therefore, the self-picture pivoting is not limited to cases where the moving picture communication apparatus 10 is pivoted either clockwise or counter clockwise at a right angle.

As a matter of fact, it may be thought that the self-picture pivoting instructions are entered to the user's cell-phone type moving picture communication apparatus 10 in order to start pivoting the self-picture information "H" when the user's communication apparatus 10 is pivoted either clockwise or counter clockwise at an angle of 90 degrees according to a user's sense of pivotal angle.

As an alternative, the moving picture communication apparatus 10 may be provided with an angle sensor for permitting the pivoting unit 2 to pivot the self-picture information "H" when the communication apparatus 10 is pivoted either counter clockwise or clockwise at an angle of 90 degrees.

It is to be noted that a pivotal angle of the moving picture communication apparatus 10 is not limited to 90 degrees, but may include a wider range of angles.

In fact, it may be thought that the pivotal angle of the communication apparatus 10 is set to be 90 degrees or otherwise a predetermined range of angles including 90 degrees.

Turning now back to FIG. 1, the user's self-picture information pivoted by the pivoting unit 2 is delivered to both of the encoding unit 6 and the inverting unit 3. Referring back to FIG. 2, the self-picture information "J" pivoted as illustrated in FIG. 2(c) is brought to the encoding unit 6 and the inverting unit 3.

The encoding unit 6 encodes the pivoted self-picture information. The encoded self-picture information is carried to the transmitting unit 7.

The transmitting unit 7 transmits the encoded self-picture information to the party's cell-phone type moving picture communication apparatus.

The inverting unit 3 pivots the self-picture information that has been pivoted by the pivoting unit 2. As a result, the self-picture information is turned at a right angle in a direction opposite to the direction in which the pivoting unit 2 pivots the self-picture information.

Referring back to FIG. 2, the inverting unit 3 pivots the self-picture information "J" of FIG. 2(c) counter clockwise at an angle of 90 degrees.

At a further step, the inverting unit 3 inverts the self-picture information that has just been pivoted by the inverting unit 3, in order to provide a mirror image of the self-picture information. The inverted self-picture information is brought to the downsizing unit 4.

The downsizing unit 4 downsizes the inverted self-picture information in order to match in size with a subsidiary image display on the image display 11. The downsized self-picture information is carried to the image-displaying unit 5.

The image-displaying unit 5 displays the downsized user's self-picture information on the image display 11.

As discussed above, the inverting unit 3 pivots the user's self-picture information that has been pivoted by the pivoting unit 2.

If the user's self-picture information is inverted to provide a mirror image thereof without being pivoted by the inverting unit 3 and subsequently the inverted self-picture information is downsized, then the user's self-picture information that has been pivoted either counter clockwise or clockwise at a right angle and further that is improperly oriented with reference to the vertical axis of the earth is displayed on the user's cell-type phone moving picture communication apparatus 10. Referring back to FIG. 2, if the self-picture information "J" pivoted clockwise at a right angle by the pivoting unit 2 as illustrated in FIG. 2(c) is non-pivoted by the inverting unit 3, then the self-picture information "J" that has been pivoted clockwise at an angle of 90 degrees is inverted to provide a mirror image thereof and is then downsized before being displayed on the image display 11.

The cell-phone type moving picture communication apparatus according to the present embodiment may include a receiving unit for receiving encoded party's picture information from the party's moving picture communication apparatus, and a decoding unit for decoding the encoded party's picture information.

Figure 11A:
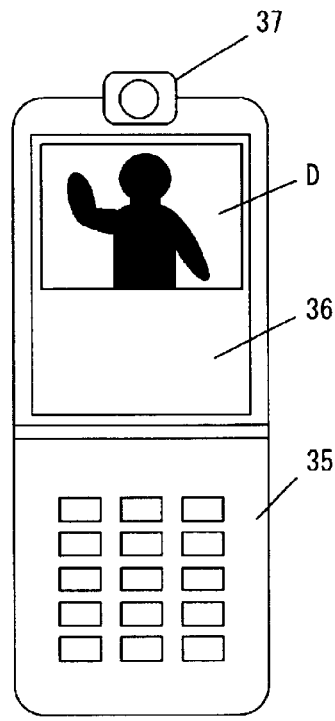
FIG. 11(a) is an exemplary illustration, showing a picture of a user's party, which is displayed on the vertically positioned conventional cell-phone type moving picture communication apparatus of a user.
Figure 11B:
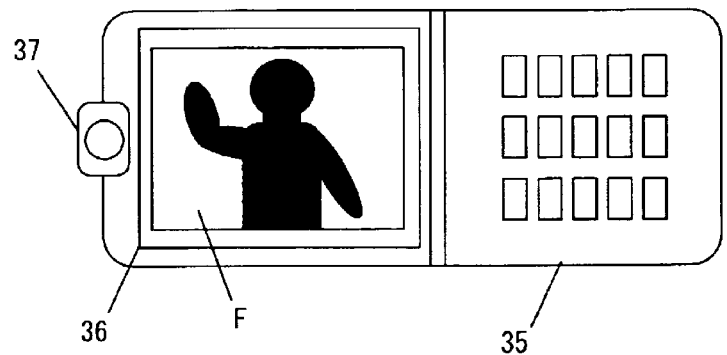
FIG. 11(b) is an exemplary illustration, showing a picture of the user's party, which is displayed on the horizontally positioned conventional cell-phone type moving picture communication apparatus of the user.
Figure 12A:
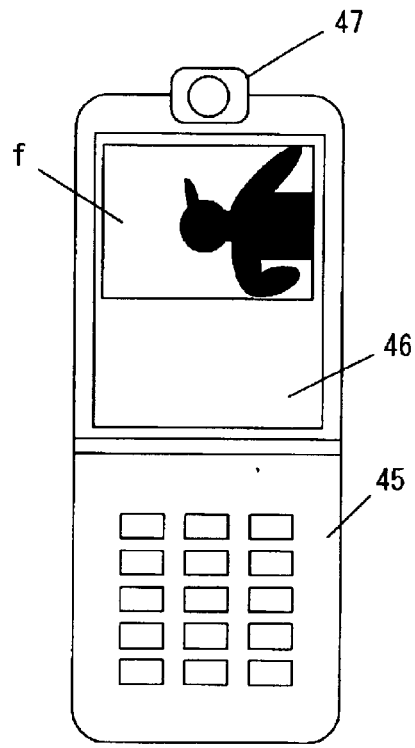
FIG. 12(a) is an exemplary illustration, showing a picture of the user, pivoted at an angle of 90 degrees, which is displayed on the conventional cell-phone type moving picture communication apparatus of the user's party.
Figure 12B:
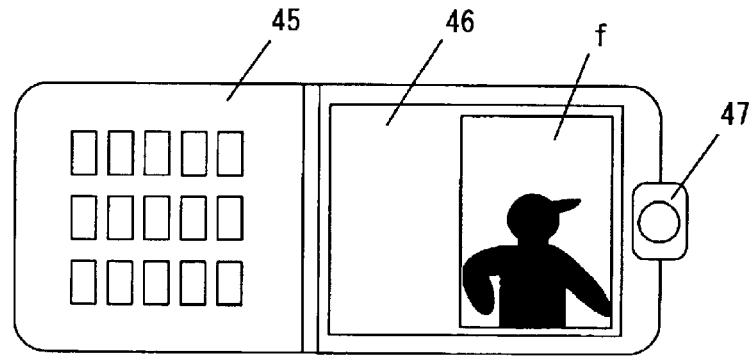
FIG. 12(b) is an exemplary illustration, showing the conventional cell-phone type moving picture communication apparatus of the user's party, which is pivoted at an angle of 90 degrees in response to the pivoted picture of the user.

The image-displaying unit 5 displays the decoded party's picture information on the image display 11. As illustrated in FIG. 11(a), the party's picture information can typically be displayed on the vertically positioned cell-phone type moving picture communication apparatus. Alternatively, as illustrated in FIG. 11(b), the enlarged party's picture information can be displayed on the horizontally positioned cell-phone type moving picture communication apparatus.

The cell-phone type moving picture communication apparatus 10 according to the present embodiment includes a function of communicating oral information other than the function of communicating the moving picture information.

FIG. 3 is an exemplary illustration how the user's cell-phone type moving picture communication apparatus according to the present embodiment is used to communicate with the party's communication apparatus. In FIG. 3, the same components as those of FIG. 2 are identified by the same reference characters. As illustrated in FIG. 3, the party's cell-phone type moving picture communication apparatus 20 includes a camera 22 and an image display 21 as well.

When the user's communication apparatus 10 is pivoted counter clockwise at a right angle, then the user's cell phone type moving picture communication apparatus 10 enlarges and pivots party's picture information at a right angle upon receipt of the party's picture information, which is transmitted from the party's cell-phone type moving picture communication apparatus 20. The enlarged and pivoted party's picture information is displayed as party's picture information "A" on the image display 11 of the user's cell-phone type moving picture communication apparatus 10.

Meanwhile, the camera 12 on the user's communication apparatus 10 picks up the user's moving image, thereby producing user's self-picture information. The pivoting unit 2 pivots the self-picture information. The pivoted self-picture information is delivered to both of the encoding unit 6 and the inverting unit 3.

The encoding unit 6 encodes the self-picture information that has been pivoted by the pivoting unit 2. The transmitting unit 7 sends the encoded self-picture information to the party's moving picture communication apparatus 20.

The user's self-picture information transmitted from the user's moving picture communication apparatus 10 is displayed as party's picture information "a" on the image display 21 of the party's moving picture communication apparatus 20.

In the user's cell-phone type moving picture communication apparatus 10, the inverting unit 3 pivots the user's self-picture information that has been pivoted by the pivoting unit 2, thereby turning the user's self-picture information at a right angle in a direction opposite to the direction in which the pivoting unit 2 pivots the user's self-picture information.

At the next step, the inverting unit 3 inverts the user's self-picture information that has just been pivoted by the inverting unit 3, thereby providing a mirror image of the user's self-picture information. The downsizing unit 4 downsizes the inverted user's self-picture information The image-displaying unit 5 displays the inverted and downsized user's self-picture information as user's self-picture information "B" on the image display 11 of the user's communication apparatus 10.

Similarly, the party's communication apparatus 20 has downsized party's self-picture information "b" displayed on the image display 21.

As described above, pursuant to the present embodiment, as illustrated in FIG. 3, when the party's picture information enlarged and pivoted at a right angle is displayed on the image display 11 of the user's moving image communication apparatus 10 that has been pivoted at a right angle in an either clockwise or counter clockwise direction of the same apparatus 10 when the user faces the image display 11, then the user's self-picture information pivoted by the pivoting unit 2 as illustrated in FIG. 2 is transmitted to the party's moving picture communication apparatus 20.

This system allows moving picture information properly positioned with reference to the vertical axis of the earth to be displayed on the party's cell phone type moving picture communication apparatus 20.

As a result, proper moving picture communication is established, even when the party's picture information enlarged and pivoted at a right angle is displayed on the image display 11 of the user's cell-phone type moving picture communication apparatus 10 that has been pivoted at an angle of 90 degrees.

The downsized user's self-picture information derived from the user's self-picture information to be sent to the party's communication apparatus 20 is displayed on the image display 11 of the user's communication apparatus 10. This system permits moving picture communication to be held while the user's self-picture information to be sent to the party's communication apparatus 20 is checked to see how it looks like.

Figure 10A:
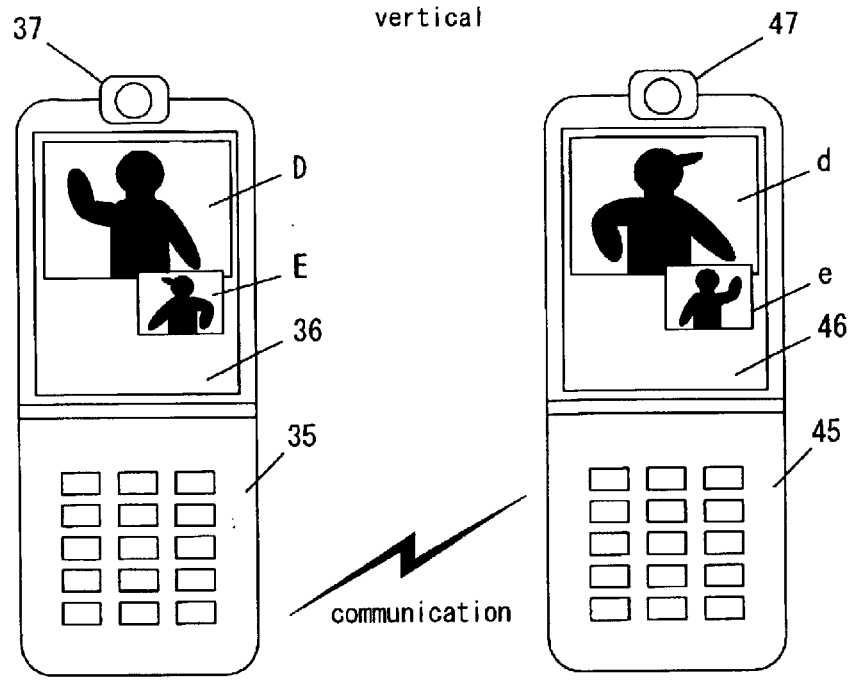
FIG. 10(a) is a descriptive illustration, showing a pair of conventional cell-phone type moving picture communication apparatus vertically positioned to communicate with one another.
Figure 10B:
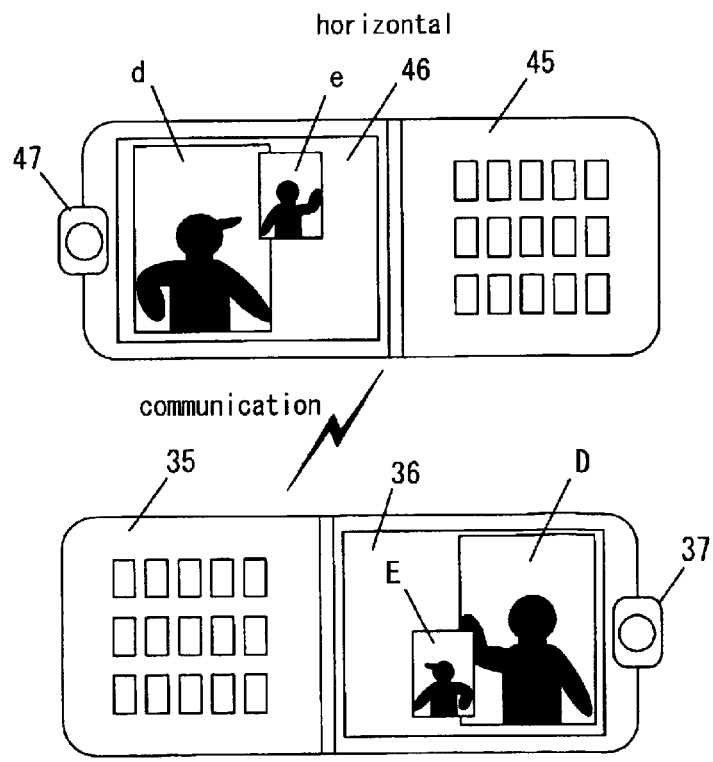
FIG. 10(b) is a descriptive illustration, showing the pair of conventional cell-phone type moving picture communication apparatus horizontally positioned to communicate with one another.

It is to be noted that a pair of vertically positioned cell-phone type moving picture communication apparatus as illustrated in FIG. 10(a) as well as a pair of horizontally positioned communication apparatus as illustrated in FIG. 10(b) may be used to communicate with one another when the cell-phone type moving picture communication apparatus 10 according to the present embodiment is used to provide TV phone-to-TV phone communication.

In this instance, the pivoting unit 2 does not pivot the self-picture information.

In addition, in the above instance, downsized user's self-picture information properly oriented with reference to the vertical axis of the earth is displayed on the user's cell-phone type moving picture communication apparatus, regardless of whether or not the user's cell-phone type moving picture communication apparatus is pivoted. Furthermore, assuming that the pair of horizontally positioned moving picture communication apparatus is used to communicate with one another, then user's self-picture information pivoted clockwise at a right angle is transmitted to the party's communication apparatus when the user's cell-phone moving picture communication apparatus are pivoted clockwise at a right angle, while user's self-picture information pivoted counter clockwise at a right angle as illustrated in FIG. 2(b) is transmitted to the party's communication apparatus when the user's cell-phone type moving picture communication apparatus are pivoted counter clockwise at a right angle. This feature is similar to that of FIG. 10.

(Embodiment 2)

Figure 4:
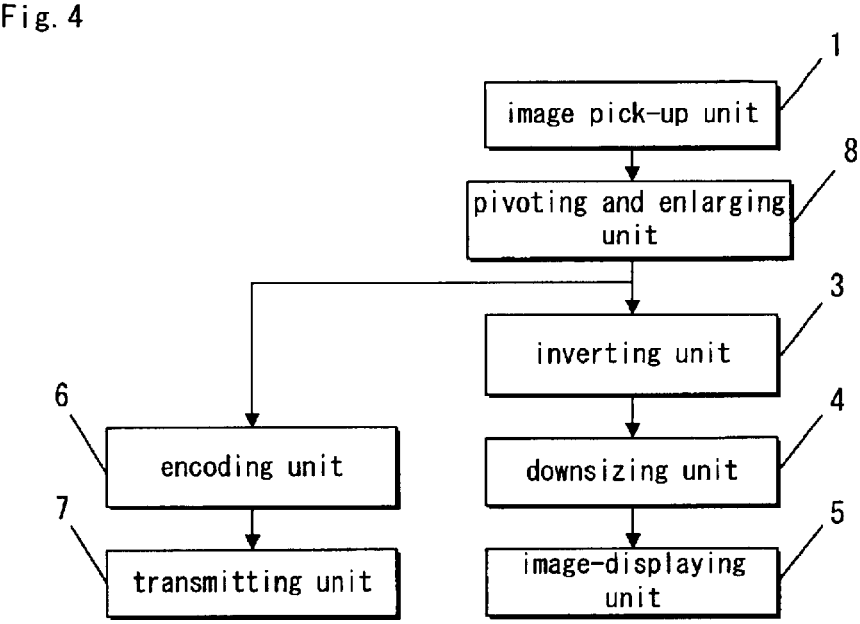
FIG. 4 is a block diagram, illustrating an exemplary cell-phone type moving picture communication apparatus according to a second embodiment.

FIG. 4 is a block diagram, illustrating an exemplary cell phone type moving picture communication apparatus according to a second embodiment.

As illustrated in FIG. 4, the moving picture communication apparatus according to the present embodiment has a pivoting and enlarging unit 8 substituted for the pivoting unit 2 according to the previous embodiment. The other components of the moving picture communication apparatus according to the present embodiment are similar to those of the cell-phone type moving picture communication apparatus of FIG. 1 according to the previous embodiment, and descriptions related thereto are herein omitted.

When picture information of a user's party, enlarged and pivoted at an angle of 90 degrees, is displayed on an image display of the cell-phone type moving picture communication apparatus of a user, which has been pivoted at a right angle in an either clockwise or counter clockwise direction of the same communication apparatus when the user faces the image display, then user's self-picture information produced by an image pick-up unit 1 of FIG. 4 is delivered to the self-picture pivoting and enlarging unit 8.

Figure 5:
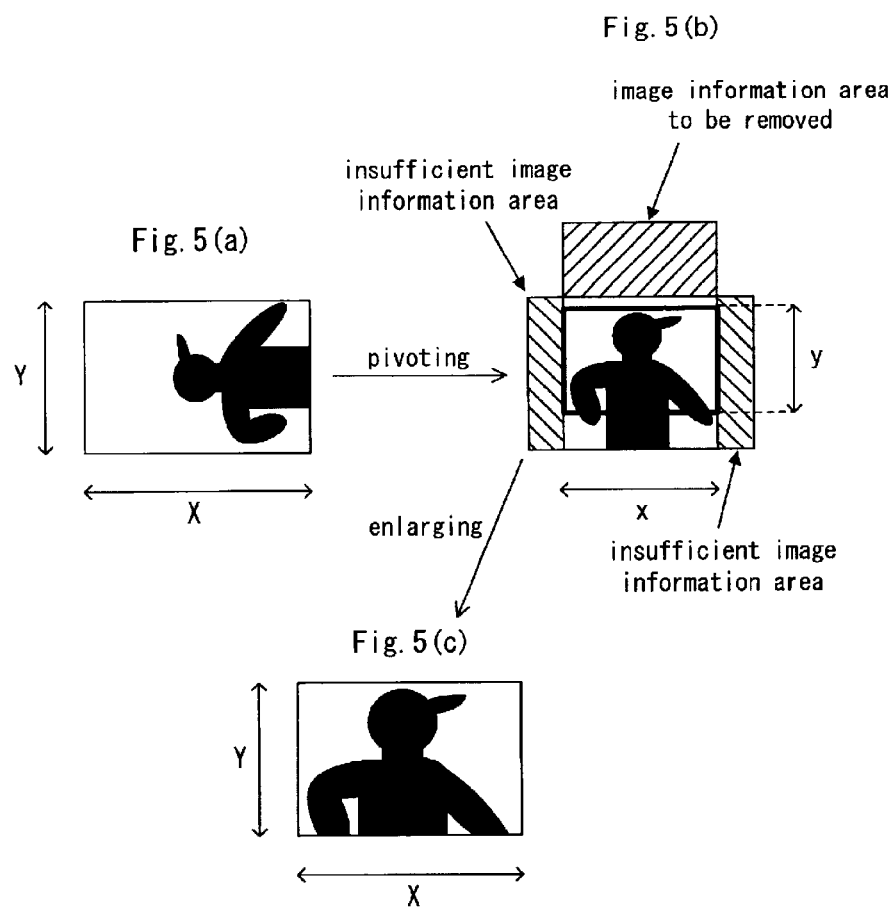
FIG. 5(a) is a descriptive illustration, showing how an exemplary pivoting and enlarging unit works in the cell-phone type moving picture communication apparatus.
FIG. 5(b) is a descriptive illustration, showing how the exemplary pivoting and enlarging unit works in the cell-phone type moving picture communication apparatus.
FIG. 5(c) is a descriptive illustration, showing how the exemplary pivoting and enlarging unit works in the cell-phone type moving picture communication apparatus.

FIG. 5 is a descriptive illustration, showing how the pivoting and enlarging unit 8 of FIG. 4 operates. FIG. 5 presupposes that a display size has an aspect ratio of Y:X.

FIG. 5(a) illustrates user's self-picture information produced using the user's moving picture communication apparatus that has been pivoted counter clockwise at a right angle as illustrated in FIG. 2(b). As illustrated in FIG. 5(a), the self-picture information has an aspect ratio of Y:X.

The pivoting and enlarging unit 8 pivots the user's self-picture information by an angle of 90 degrees. FIG. 5(b) illustrates the pivoted user's self-picture information.

As illustrated in FIG. 5(b), when the self-picture information having an aspect ratio defined by different vertical and horizontal lengths is displayed by being pivoted at a right angle, then there occurs an image information area to be removed, as defined by hatched lines at an upper-clockwise slant, and insufficient image information areas as defined by hatched lines at a lower-clockwise slant.

The pivoting and enlarging unit 8 enlarges part of the 90-degree pivoted self-picture information in accordance with the aspect ratio (Y:X) of the display size. For example, the pivoting and enlarging unit 8 enlarges part of the self-picture information as defined by a bold line having an aspect ratio of x:y (see FIG. 5(b)) in such a manner that the variables y, x are equal to Y and X, respectively.

FIG. 5(c) illustrates enlarged self-picture information that results from the above-described enlarging step as shown in FIG. 5(b) using the pivoting and enlarging unit 8.

This is the way in which the pivoting and enlarging unit 8 enlarges part of the 90-degree pivoted self-picture information according to the display size aspect ratio, thereby eliminating a display area that is insufficient in image information.

It is to be noted that pivoting and enlarging steps as discussed above may be taken either in this order or in opposite order.

Turning back to FIG. 4, the self-picture information enlarged and pivoted by the pivoting and enlarging unit 8 is carried to both of the encoding unit 6 and the inverting unit 3.

The encoding unit 6 encodes the enlarged and pivoted self-picture information. The transmitting unit 7 transmits the encoded self-picture information to the party's moving picture communication apparatus.

The inverting unit 3 pivots the enlarged and pivoted self-picture information as well as inverting the enlarged and pivoted self-picture information in order to provide a mirror image of the self-picture information. The downsizing unit 4 downsizes the pivoted and inverted self-picture information. The image-displaying unit 5 displays the downsized self-picture information on the image display of the user's moving picture communication apparatus As discussed above, pursuant to the present embodiment, when the party's picture information enlarged and pivoted at a right angle is displayed on the image display of the user's cell-phone type moving picture communication apparatus that has been pivoted at a right angle in an either counter clockwise or clockwise direction of the same communication apparatus when the user faces the image display, then the user's self-picture information enlarged and pivoted by the pivoting and enlarging unit 8 is transmitted to the party's cell-phone type moving picture communication apparatus.

This system allows moving image information properly positioned with reference to the vertical axis of the earth to be displayed on the party's cell-phone type moving picture communication apparatus, and further allows the user's self-picture information in compliance with a display size of the party's cell-phone type moving picture communication apparatus to be transmitted to the party's moving picture communication apparatus.

As a result, proper moving picture communication that matches in display size with the party's moving picture communication apparatus is established, even when party's picture information enlarged and pivoted at a right angle is displayed on the image display of the user's cell-phone type moving picture communication apparatus that has been pivoted at an angle of 90 degrees.

In addition, the downsized self-picture information resulting from the user's self-picture information to be sent to the party's cell-phone type moving picture communication apparatus is displayed on the image display of the user's cell-phone type moving picture communication apparatus. This system permits moving picture communication to be held while the user's self-picture information to be sent to the party's communication apparatus is checked to see how it looks like.

(Embodiment 3)

Figure 6:
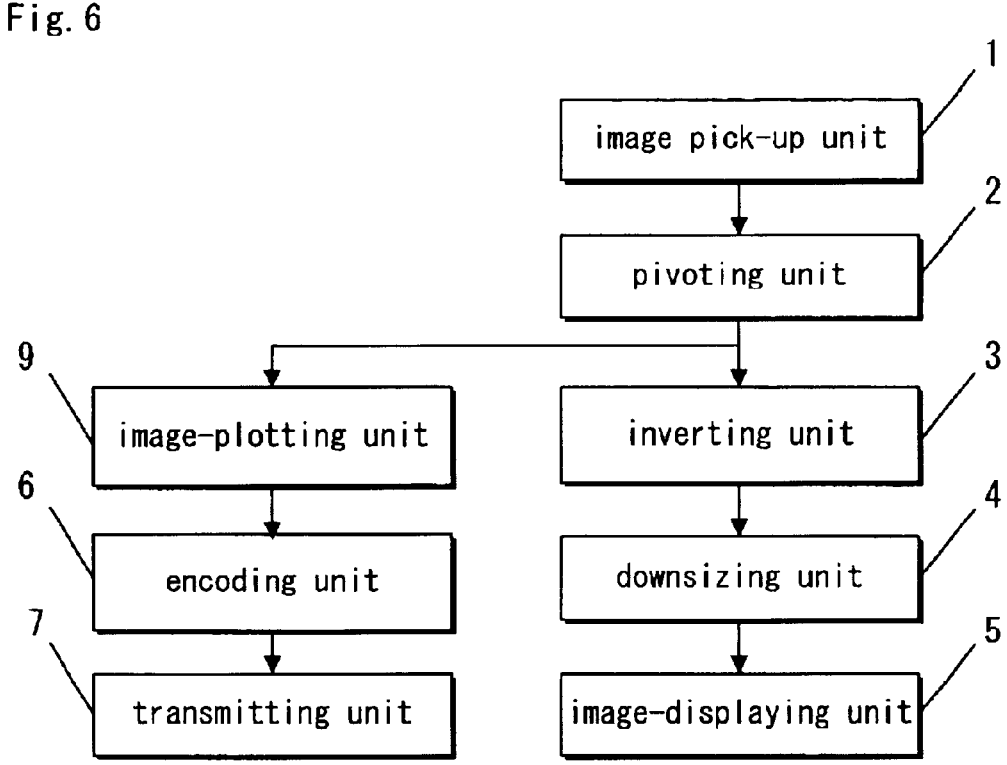
FIG. 6 is a block diagram, illustrating an exemplary cell-phone type moving picture communication apparatus according to a third embodiment.

FIG. 6 is a block diagram, illustrating an exemplary cell-phone type moving picture communication apparatus according to a third embodiment.

As illustrated in FIG. 6, the moving picture communication apparatus according to the present embodiment includes an image-plotting unit 9 in addition to the components of FIG. 1 according to the first embodiment. Since the other components of the moving picture communication apparatus according to the present embodiment are similar to those of the cell-phone type moving picture communication apparatus of FIG. 1 according to the first embodiment, description related thereto are omitted.

When picture information of a user's party, enlarged and pivoted at a right angle, is displayed on an image display of the cell-phone type moving picture communication apparatus of a user, which has been pivoted at a right angle in an either clockwise or counter clockwise direction of the same communication apparatus when the user faces the image display, then a pivoting unit 2 pivots user's self-picture information produced by an image pick-up unit 1. The pivoted self-picture information is delivered to both of the image-plotting unit 9 and an inverting unit 3

Figure 7:
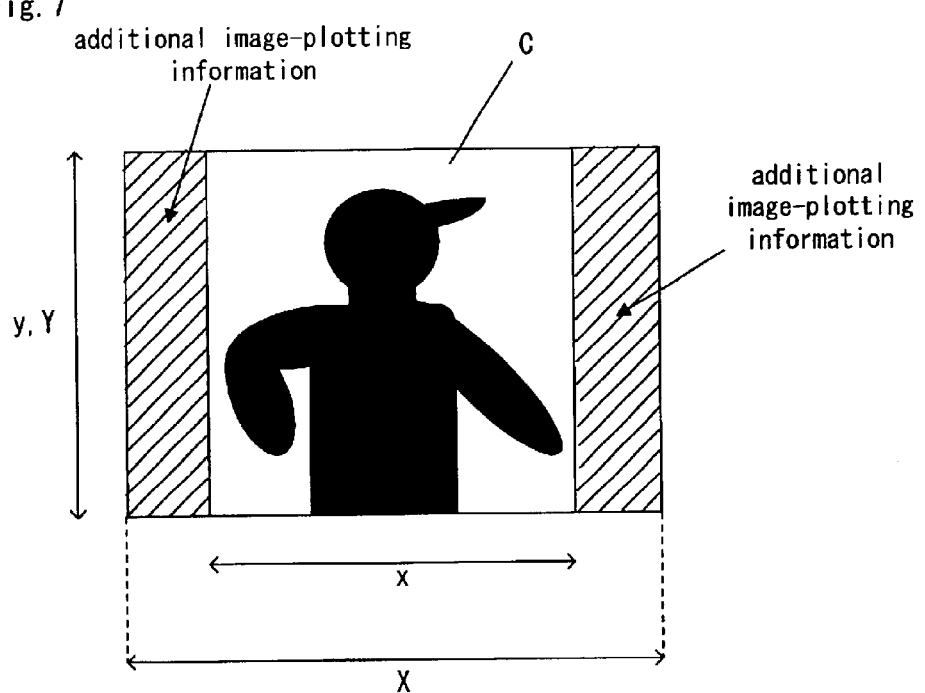
FIG. 7 is a descriptive illustration, showing how an exemplary image-plotting unit works in the cell-phone type moving picture communication apparatus.

FIG. 7 is a descriptive illustration, showing how an exemplary image-plotting unit 9 of FIG. 6 works. In FIG. 7, a display size has an aspect ratio of Y:X.

As illustrated in FIG. 7, the image-plotting unit 9 provides additional image-plotting information (see hatched lines) to pivoted user's self-picture information "C". The image-plotting unit 9 is designed to add various pieces of information such as figure information and character information by way of added image-plotting information.

Turning back to FIG. 6, an encoding unit 6 encodes the user's self-picture information that has the additional image-plotting information provided thereto by the image-plotting unit 9. A transmitting unit 7 transmits the encoded self-picture information to a cell-phone type moving picture communication apparatus of the user's party.

The inverting unit 3 pivots the pivoted user's self-picture information as well as inverting the pivoted user's self-picture information in order to provide a mirror image of the pivoted self-picture information. A downsizing unit 4 downsizes the inverted and pivoted self-picture information. An image-displaying unit 5 displays the downsized self-picture information on the image display of the user's cell-phone type moving picture communication apparatus.

As described above, pursuant to the present embodiment, when the party's picture information enlarged and pivoted at a right angle is displayed on the image display of the user's cell-phone type moving picture communication apparatus that has been pivoted at a right angle in an either counter clockwise or clockwise direction of the same communication apparatus when the user faces the image display, then the user's self-picture information pivoted by the pivoting unit 2 is transmitted to the party's cell-phone type moving picture communication apparatus.

This system allows moving picture information properly oriented with respect to the vertical axis of the earth to be displayed on the party's moving picture communication apparatus.

As a result, proper moving picture communication is established, even when the party's picture information enlarged and pivoted at an angle of 90 degrees is displayed on the image display of the user's cell-phone type moving picture communication apparatus that has been pivoted at an angle of 90 degrees.

As illustrated in FIG. 7, the image-plotting unit 9 provides additional image-plotting information to the user's self-picture information. This system allows other information such as character information in addition to moving pictures to be transmitted to the party's cell-phone type moving picture communication apparatus.

The downsized self-picture information derived from the user's self-picture information to be sent to the party's moving picture communication apparatus is displayed on the image display of the user's moving picture communication apparatus. This system permits moving picture communication to be held while the user's self-picture information to be sent to the party's communication apparatus is checked to see how it looks like.

Now, a variation of the cell-phone type moving picture communication apparatus according to the present embodiment is described. In this variation, the image pick-up unit 1 produces a square of self-picture information. The square of self-picture information is carried to the pivoting unit 2. The other steps are similar to those of FIG. 6 according to present embodiment.

As illustrated in FIG. 7, the term "square of self-picture information" refers to self-picture information "C" having an aspect ratio of y:x equivalent to 1:1, respectively.

This means that the present variation only requires at least only a square as an area that contains a moving image (or rather a self-picture) to be picked up, even with moving picture communication environments in which moving picture information having an aspect ratio defined by different vertical and horizontal lengths is communicated. This feature is realized by the addition of image-plotting information. As a result, the image pick-up unit 1 can include a reduced capacity of memory.

Moreover, the square of self-picture information provides simplified coordinate calculation for use in pivoting the self-picture information. This feature allows the pivoting unit 2 to pivot the self-picture information in a simplified manner and allows the self-picture information to be processed at steps that require less man-hour rates.

(Embodiment 4)

A cell-phone type moving picture communication apparatus according to the present embodiment is entirely similar in structure to that of FIG. 6 according to the third embodiment. Therefore, the moving picture communication apparatus according to the present embodiment is now described with reference to FIG. 6.

However, the moving picture communication apparatus according to the present embodiment differs from that according to the third embodiment in that the image-plotting unit 9 provides additional image-plotting information to self-picture information other than when an enlarged picture of a user's party is displayed on the pivoted cell-phone type moving picture communication apparatus of a user.

The following describes steps to be taken in the communication apparatus according to the present embodiment.

When party's picture information enlarged and pivoted at a right angle is displayed on an image display of the user's cell-phone type moving picture communication apparatus that has been pivoted at a right angle either in a clockwise or counter clockwise direction of the same communication apparatus when the user faces the image display, then steps are taken in the communication apparatus according to the present embodiment in a manner similar to the way in which those are taken in the communication apparatus according to the third embodiment. Therefore, descriptions related thereto are herein omitted.

Next, the way in which steps are taken in the non-pivoted cell-phone type moving picture communication apparatus according to the present embodiment is described below.

Figure 8:
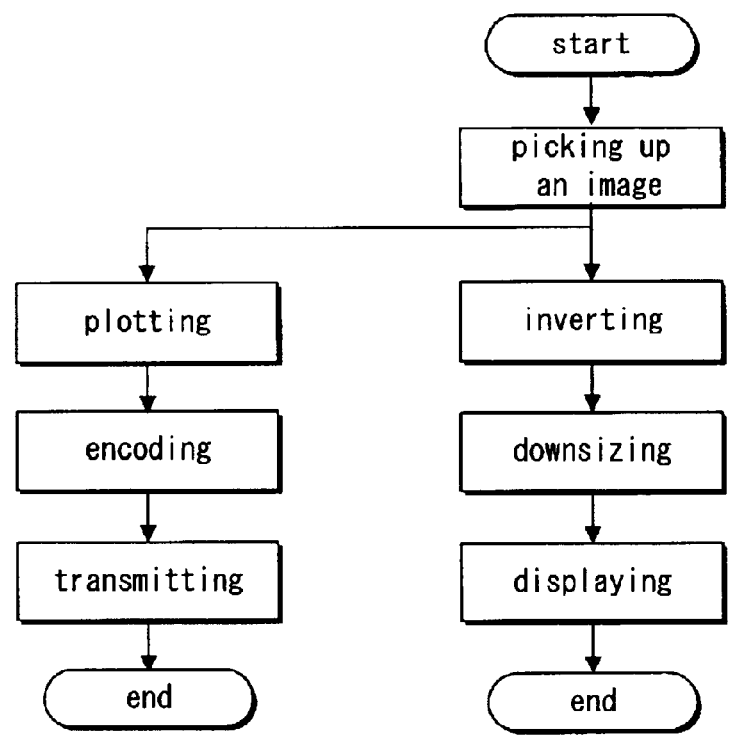
FIG. 8 is a flowchart, illustrating exemplary steps to be taken in a cell-phone type moving picture communication apparatus according to a fourth embodiment.
Figure 9:
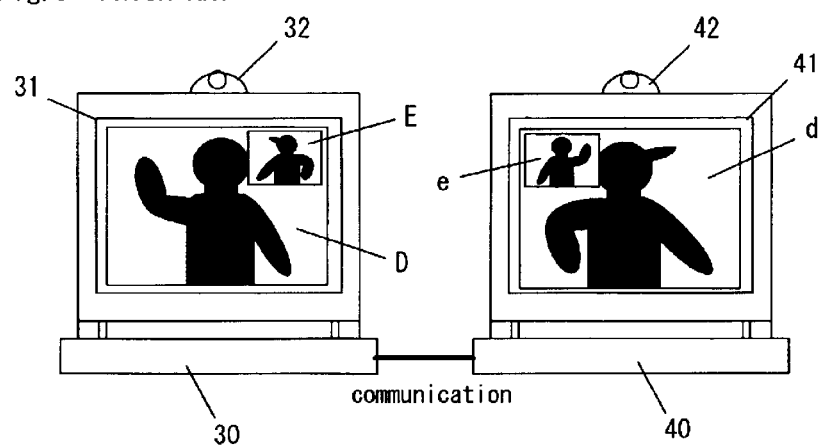
FIG. 9 is an exemplary illustration, showing a typical stationary moving picture communication apparatus.

FIG. 8 is a flowchart, illustrating exemplary steps to be taken in the user's communication apparatus according to the present embodiment, which is non-pivoted at a right angle either in a clockwise or counter clockwise direction of the same communication apparatus when the user faces the image display of the user's communication apparatus.

As illustrated in FIG. 8, at step 1, an image pick-up unit 1 produces user's self-picture information. The self-picture information is delivered to both an image-plotting unit 9 and an inverting unit 3.

At step 2, the image-plotting unit 9 removes part of the self-picture information produced by the image pick-up unit 1, and then provides additional image-plotting information to the self-picture information.

The image-plotting unit 9 is designed to add various pieces of information such as figure information and character information as added image-plotting information.

As illustrated in FIG. 7, the image-plotting unit 9 provides additional image-plotting information to the self-picture information on both sides thereof, or alternatively on only either side thereof.

The image-plotting unit 9 is free to add different amounts of additional image-plotting information to the self-picture information.

For example, the image-plotting unit 9 varies the amount of additional image plotting information in response to a communication state. More specifically, when a poor moving picture communication state reduces communication data speeds, then the image-plotting unit 9 provides an increased amount of additional image-plotting information to the self-picture information. This means that a stationary picture area is increased, while a moving picture area or rather the self-picture information is further decreased.

This system makes it feasible to reduce the resulting coding amount when an interframe predictive coding system is used. As a result, the user's self-picture information can be transmitted to the party's cell-phone type moving picture communication apparatus while the number of frames to be transferred per second is retained. Thus, moving pictures whose quality is retained to a certain level can be transmitted to the party's cell-phone type moving picture communication apparatus.

The user's self-picture information having the additional image-plotting information provided thereto is delivered to the encoding unit 6. At step 3, the encoding unit 6 encodes the self-picture information having the additional image-plotting information carried thereon. The encoded self-picture information is brought to the transmitting unit 7.

At step 4, the transmitting unit 7 transmits the encoded user's self-picture information to the party's cell-phone type moving picture communication apparatus.

At step 5, the inverting unit 3 inverts the user's self-picture information that is produced by the image pick-up unit 1, thereby providing a mirror image of the self-picture information. The inverted self-picture information is delivered to the downsizing unit 4.

At step 6, the downsizing unit 4 downsizes the inverted self-picture information so as to match in size with a subsidiary image display on the user's moving picture communication apparatus. The downsized user's self-picture information is carried to the image-displaying unit 5.

At step 7, the image-displaying unit 5 displays the downsized user's self-picture information on the image display of the user's cell-phone type moving picture communication apparatus.

As described above, when the party's picture information enlarged and pivoted at a right angle is displayed on the image display of the user's moving picture communication apparatus that has been pivoted at a right angle either in a clockwise or counter clockwise direction of the same communication apparatus when the user faces the image display, then user's self-picture information pivoted by the pivoting unit 2 is transmitted to the party's cell-phone type moving picture communication apparatus.

This system allows moving picture information properly oriented with respect to the vertical axis of the earth to be displayed on the party's communication apparatus.

As a result, proper moving picture communication is established, even when the party's picture information enlarged and pivoted at a right angle is displayed on the image display of the user's moving picture communication apparatus that has been pivoted at an angle of 90 degrees.

The image-plotting unit 9 is designed to provide additional image-plotting information to the user's self-picture information, regardless of whether the user's cell-phone type moving picture communication apparatus is pivoted. This feature allows the user's self-picture information to be transmitted to the party's communication apparatus in the same form between when the user's moving picture communication apparatus is pivoted to communicate with the party's communication apparatus and when the user's communication apparatus is non-pivoted to communicate therewith.

For example, as illustrated in FIG. 7, the self-picture information having additional image-plotting information provided thereto at both sides thereof can be transmitted to the party's communication apparatus when the user's moving picture communication apparatus is pivoted to communicate with the party's communication apparatus and when the user's communication apparatus is non-pivoted to communicated therewith.

The image-plotting unit 9 is capable of providing different amounts of image-plotting information to the self-picture information in accordance with a communication state.

When a bad moving picture communication status reduces communication data speeds, then the image-plotting unit 9 provides a different amount of image-plotting information to the self-picture information, thereby further reducing a moving picture area. The reduction in moving picture area decreases the resulting coding amount. As a result, the user's self-picture information can be transmitted to the party's communication apparatus while the number of frames to be transferred per second is retained.

The downsized self-picture information derived from the user's self-picture information to be sent to the party's moving picture communication apparatus is displayed on the image display of the user's cell-phone type moving picture communication apparatus. This system allows moving picture communication to be held while the user's self-picture information to be sent to the party's communication apparatus is checked to see how it looks like.

A first variation of the cell-phone type moving picture communication apparatus according to the present embodiment is now described. In the first variation, the image pick-up unit 1 produces a square of self-picture information.

When party's picture information enlarged and pivoted at a right angle is displayed on the image display of the user's cell-phone type moving picture communication apparatus that has been pivoted at a right angle in an either clockwise or counter clockwise direction of the same communication apparatus when the user faces the image display, then the square of self-picture information is delivered to the pivoting unit 2. The subsequent steps are similar to those according to the present embodiment.

When the party's picture information displayed on the image display of the user's communication apparatus is neither enlarged nor pivoted at a right angle, then the square of self-picture information generated by the image pick-up unit 1 is delivered to both of the image-plotting unit 9 and the inverting unit 3. The subsequent steps are similar to those according to the present embodiment.

The term "square of self-picture information" is similar to that of the variation according to the third embodiment.

This means that the first variation requires at least only a square as an area that contains a moving image (or rather a self-picture) to be picked up, even with moving picture communication environments in which moving picture information having an aspect ratio defined by different vertical and horizontal lengths is communicated. This feature is realized by the addition of image-plotting information. As a result, the image pick-up unit 1 can include a reduced capacity of memory.

Moreover, the square of self-picture information provides simplified coordinate calculation for use in pivoting the self-picture information. This feature allows the pivoting unit 2 to pivot the self-picture information in a simplified manner, and allows the self-picture information to be processed at steps that require less man-hour rates.

A second variation of the cell-phone type moving picture communication apparatus according to the present embodiment is now described. The second variation deletes the pivoting unit 2 from the cell-phone type moving picture communication apparatus according to the present embodiment.

As a result, the self-picture information produced by the image pick-up unit 1 is always brought to both of the image-plotting unit 9 and the inverting unit 3. The second variation also provides beneficial effects based on the image-plotting unit 9 in a manner similar to the way in which the cell phone type moving picture communication apparatus according to the present embodiment provides beneficial effects.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A first moving picture communication apparatus of a first user operable to communicate moving picture information with a second moving picture communication apparatus of a second user, said first moving picture communication apparatus comprising:
   an image display having an aspect ratio defined by different vertical and horizontal lengths;
   an image display unit operable to control said image display to display enlarged and pivoted, through an angle of substantially 90 degrees, second user picture information on said image display of said first moving picture communication apparatus that has been pivoted in a clockwise or counter clockwise direction when the first user faces said image display;
   an image pick-up unit operable to produce first user picture information;
   a pivoting and enlarging unit operable to pivot and enlarge the first user picture information in response to pivotal movement of said first moving picture communication apparatus;
   an encoding unit operable to encode the enlarged pivoted first user picture information;
   a transmitting unit operable to transmit the encoded first user picture information to the second moving picture communication apparatus;
   a clockwise-counter clockwise inverting unit operable to further pivot and invert the enlarged pivoted first user picture information in order to provide a minor image of the first user picture information; and
   a downsizing unit operable to downsize the inverted further pivoted first user picture information that has been pivoted,
   wherein the image display unit is operable to instruct said image display to display the downsized first user picture information on said image display.

2. A moving picture communication method comprising:
   communicating moving picture information between a first moving picture communication apparatus of a first user and a second moving picture communication apparatus of a second user, the first moving picture communication apparatus having an image display that has an aspect ratio defined by different vertical and horizontal lengths;
   receiving, with the first moving picture communication apparatus, second user picture information from the second moving picture communication apparatus;
   pivoting the second user picture information through an angle of substantially 90 degrees; enlarging
   the second user picture information;
   displaying the pivoted and enlarged second user picture information on the image display of the first moving picture communication apparatus that has been pivoted in a direction, the direction being one of clockwise and counter clockwise of the first moving picture communication apparatus when the first user faces the image display of the first moving picture communication apparatus;
   producing first user picture information;
   pivoting the first user picture information in response to said pivoting of the first moving picture communication apparatus;
   encoding the pivoted first user picture information;
   transmitting the encoded first user picture information to the second moving picture communication apparatus;
   inverting the pivoted first user picture information to provide a mirror image of the first user picture information;
   further pivoting the pivoted inverted first user picture information;
   downsizing the inverted further pivoted first user picture information; and
   displaying the downsized first user picture information on the image display.

3. A first moving picture communication apparatus of a first user operable to communicate moving picture information with a second moving picture communication apparatus of a second user and operable to receive second user picture information from the second moving picture communication apparatus, said first moving picture communication apparatus comprising:
   an image display having an aspect ratio defined by different vertical and horizontal lengths;
   an image display unit operable to control said image display to display second user picture information on said image display;
   an image pick-up unit operable to produce first user picture information;
   an image-plotting unit operable to provide image-plotting information to the first user picture information;
   an encoding unit operable to encode the first user picture information with the image-plotting information;
   a transmitting unit operable to transmit the encoded first user picture information to the second moving picture communication apparatus; and
   a pivoting unit operable to pivot the first user picture information in response to pivotal movement of said first moving picture communication apparatus,
   wherein said image display unit is operable to control said image display to display enlarged and pivoted, through an angle of substantially 90 degrees, second user picture information when said first moving picture communication apparatus has been pivoted in a clockwise or counter clockwise direction when the first user faces said image display apparatus,
   wherein said image-plotting unit is operable to provide the image-plotting information to the pivoted first user picture information.

4. A moving picture communication method comprising:
   communicating moving picture information between a first moving picture communication apparatus of a first user and a second moving picture communication apparatus of a second user, the first moving picture communication apparatus having an image display that has an aspect ratio defined by different vertical and horizontal lengths;

receiving, with the first moving picture communication apparatus, second user picture information from the second moving picture communication apparatus;

pivoting the second user picture information through an angle of substantially 90 degrees;

enlarging the second user picture information;

displaying the pivoted and enlarged second user picture information on the image display of the first moving picture communication apparatus that has been pivoted in a direction, the direction being one of clockwise and counter clockwise of the first moving picture communication apparatus when the first user faces the image display of the first moving picture communication apparatus;

producing first user picture information;

pivoting the first user picture information in response to said pivoting of the first moving picture communication apparatus;

enlarging the first user picture information;

encoding the pivoted and enlarged first user picture information;

transmitting the encoded first user picture information to the second moving picture communication apparatus;

inverting the enlarged pivoted first user picture information to provide a mirror image of the first user picture information;

further pivoting the enlarged pivoted first user picture information;

downsizing the inverted further pivoted first user picture information; and displaying the downsized first user picture information on the image display.

5. A moving picture communication method comprising:

communicating moving picture information between a first moving picture communication apparatus of a first user and a second moving picture communication apparatus of a second user, the first moving picture communication apparatus having an image display that has an aspect ratio defined by different vertical and horizontal lengths;

receiving, with the first moving picture communication apparatus, second user picture information from the second moving picture communication apparatus;

pivoting the second user picture information through an angle of substantially 90 degrees; enlarging the second user picture information;

displaying the pivoted and enlarged second user picture information on the image display of the first moving picture communication apparatus that has been pivoted in a direction, the direction being one of clockwise and counter clockwise of the first moving picture communication apparatus when the first user faces the image display of the first moving picture communication apparatus;

producing first user picture information;

pivoting the first user picture information in response to said pivoting of the first moving picture communication apparatus;

providing image-plotting information to the pivoted first user picture information;

encoding the pivoted first user picture information with the image-plotting information; and transmitting the encoded first user picture information to the second moving picture communication apparatus.

6. The method as defined in claim 5, wherein said providing additional image-plotting information to the first user picture information includes providing different image-plotting information to the first user picture information based on a communication state.

7. The method as defined in claim 5, wherein producing first user picture information comprises producing a square of the first user picture information.

8. The method as defined in claim 5, further comprising:

inverting the pivoted first user picture information to provide a mirror image of the first user picture information;

further pivoting the pivoted first user picture information;

downsizing the inverted further pivoted first user picture information; and displaying the downsized first user picture information on the image display.

9. A first moving picture communication apparatus of a first user operable to communicate moving picture information with a second moving picture communication apparatus of a second user, said first moving picture communication apparatus comprising:

an image display having an aspect ratio defined by different vertical and horizontal lengths;

an image display unit operable to control said image display to display enlarged and pivoted, through an angle of substantially 90 degrees, second user picture information on said image display of said first moving picture communication apparatus that has been pivoted in a clockwise or counter clockwise direction when the first user faces said image display;

an image pick-up unit operable to produce first user picture information;

a pivoting unit operable to pivot the first user picture information in response to pivotal movement of said first moving picture communication apparatus;

an image-plotting unit operable to provide image-plotting information to the pivoted first user picture information;

an encoding unit operable to encode the pivoted first user picture information with the image-plotting information; and a transmitting unit operable to transmit the encoded first user picture information to the second moving picture communication apparatus.

10. The moving picture communication apparatus as defined in claim 9, wherein said image-plotting unit is operable to provide different image-plotting information to the first user picture information based on a communication state.

11. A moving picture communication apparatus as defined in claim 9, wherein said image pick-up unit is operable to generate a square of the first user picture information.

12. The moving picture communication apparatus as defined in claim 9, further comprising:

a clockwise-counter clockwise inverting unit operable to further pivot and invert the pivoted first user picture information in order to provide a mirror image of the first user picture information; and a downsizing unit operable to downsize the inverted further pivoted first user picture information, wherein the image display unit is operable to control said image display to display the downsized first user picture information on said image display.

13. A moving picture communication method comprising:
communicating moving picture information between a first moving picture communication apparatus of a first user and a second moving picture communication apparatus of a second user, the first moving picture communication apparatus having an image display that has an aspect ratio defined by different vertical and horizontal lengths;
receiving, with the first moving picture communication apparatus, second user picture information from the second moving picture communication apparatus;
displaying the second user picture information on the image display;
producing first user picture information;
providing image-plotting information to the first user picture information;
encoding the first user picture information with the image-plotting information;
transmitting the encoded first user picture information to the second moving picture communication apparatus;
inverting the first user picture information in order to provide a minor image of the first user picture information;
downsizing the first user picture information; and
displaying the inverted and downsized first user picture information on the image display.

14. A moving picture communication method comprising:
communicating moving picture information between a first moving picture communication apparatus of a first user and a second moving picture communication apparatus of a second user, the first moving picture communication apparatus having an image display that has an aspect ratio defined by different vertical and horizontal lengths;
receiving, with the first moving picture communication apparatus, second user picture information from the second moving picture communication apparatus;
displaying the second user picture information on the image display;
producing first user picture information;
providing image-plotting information to the first user picture information;
encoding the first user picture information with the image-plotting information;
transmitting the encoded first user picture information to the second moving picture communication apparatus; and
pivoting the first user picture information in response to a pivotal movement of the first moving picture communication apparatus,
wherein said displaying the second user picture information comprises pivoting the second user picture information through an angle of substantially 90 degrees, enlarging the second user picture information, pivoting the first moving picture communication apparatus in a clockwise or counter clockwise direction when the first user faces the image display and displaying the pivoted and enlarged second user picture information on the image display, and
wherein said providing image-plotting information to the first user picture information comprises providing the image-plotting information to the pivoted first user picture information.

15. A first moving picture communication apparatus of a first user operable to communicate moving picture information with a second moving picture communication apparatus of a second user party, said first moving picture communication apparatus comprising:
an image display having an aspect ratio defined by different vertical and horizontal lengths;
an image display unit operable to control said image display to display enlarged and pivoted, through an angle of substantially 90 degrees, second user picture information on said image display of said first moving picture communication apparatus that has been pivoted in a clockwise or counter clockwise direction when the first user faces said image display;
an image pick-up unit operable to produce first user picture information;
a pivoting unit operable to pivot the first user picture information in response to pivotal movement of said first moving picture communication apparatus;
an encoding unit operable to encode the pivoted first user picture information;
a transmitting unit operable to transmit the encoded first user picture information to the second moving picture communication apparatus;
a clockwise-counter clockwise inverting unit operable to further pivot and invert the pivoted first user picture information in order to provide a mirror image of the first user picture information; and
a downsizing unit operable to downsize the inverted further pivoted first user picture information,
wherein the image display unit is operable to control said image display to display the downsized first user picture information on said image display.

16. A first moving picture communication apparatus of a first user operable to communicate moving picture information with a second moving picture communication apparatus of a second user and operable to receive second user picture information from the second moving picture communication apparatus, said first moving picture communication apparatus comprising:
an image display having an aspect ratio defined by different vertical and horizontal lengths;
an image display unit operable to control said image display to display second user picture information on said image display;
an image pick-up unit operable to produce first user picture information;
an image-plotting unit operable to provide image-plotting information to the first user picture information;
an encoding unit operable to encode the first user picture information with the image-plotting information;
a transmitting unit operable to transmit the encoded first user picture information to the second moving picture communication apparatus;
a clockwise-counter clockwise inverting unit operable to invert the first user picture information in order to provide a mirror image of the first user picture information; and
a downsizing unit operable to downsize the first user picture information,
wherein said image display unit is operable to instruct said image display to display the inverted and downsized first user picture information on said image display.

* * * * *